Figure 1:
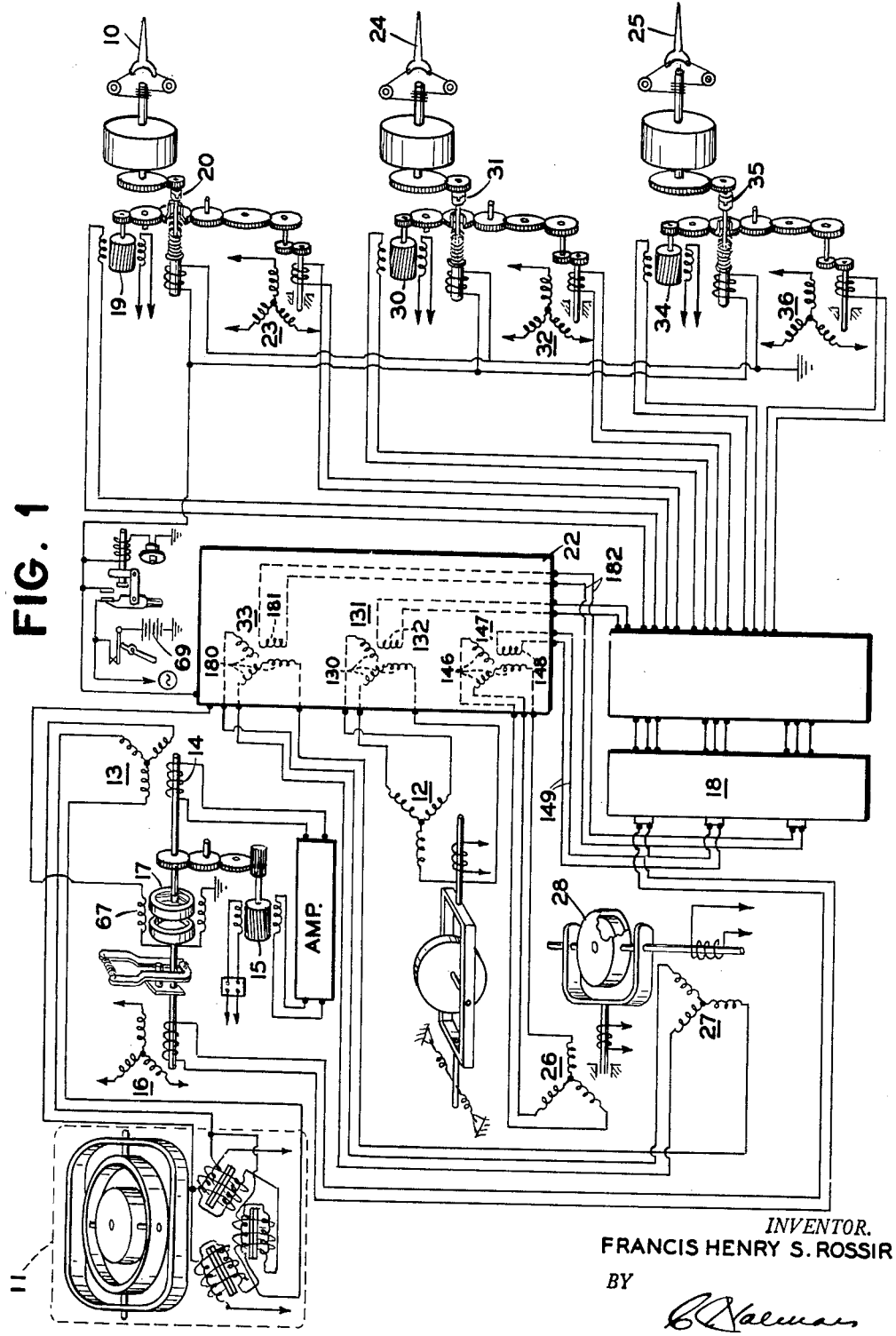

Feb. 28, 1956     F. H. S. ROSSIRE     2,736,517
TURN CONTROLLER FOR AUTOMATIC PILOT SYSTEMS
Filed May 27, 1950     2 Sheets-Sheet 1

INVENTOR.
FRANCIS HENRY S. ROSSIRE
BY
ATTORNEY

Feb. 28, 1956 F. H. S. ROSSIRE 2,736,517
TURN CONTROLLER FOR AUTOMATIC PILOT SYSTEMS
Filed May 27, 1950 2 Sheets-Sheet 2

INVENTOR.
FRANCIS HENRY S. ROSSIRE
BY
ATTORNEY

United States Patent Office 2,736,517
Patented Feb. 28, 1956

2,736,517

TURN CONTROLLER FOR AUTOMATIC PILOT SYSTEMS

Francis Henry S. Rossire, Leonia, N. J., assignor to Bendix Aviation Corporation, Teterboro, N. J., a corporation of Delaware Application May 27, 1950, Serial No. 164,659

7 Claims. (Cl. 244—77)

This invention relates to automatic pilot or control systems for dirigible craft and more particularly to novel automatic turn provisions therefor and as such constitutes an improvement over the automatic turn control unit of copending applications Serial No. 604,861, filed July 13, 1945, and now U. S. Patent No. 2,516,641, issued July 25, 1950, and Serial No. 595,236, filed May 22, 1945, and now U. S. Patent No. 2,516,796, issued July 25, 1950, the latter in turn constituting a division of application Serial No. 516,489, filed December 31, 1943.

The instant invention embodies an improved automatic pilot which particularly provides for the automatic turning of dirigible craft operating at high speeds.

As disclosed in the above noted copending applications, prior arrangements of automatic pilots provided motor actuated rudder, aileron and elevator surfaces which were adapted for operation independently of the master instruments. Manually operable devices were positioned in a control panel which actuated signal developing means, the latter in turn operating the craft's control surfaces. Included in the control panel was a single turn control knob which simultaneously actuated interconnected bank, turn and pitch controllers; the amount of displacement of the pitch controller being directly dependent upon the displacement of the turn controller.

At high speeds, the amount of rudder movement in craft executing a turn is extremely small, or even zero. Although the rudder movement is small, the amount of craft pitch deflection remains substantially the same as when the craft is flown at lower speeds. For this reason, prior automatic pilot systems could not function in an optimum manner when high speeds were attained by aircraft because of the adjustment of the elevator controller was dependent upon the setting of the rudder controller.

The present invention, therefore, contemplates a novel turn mechanism wherein the amount of pitch deflection is independent of the rudder deflection when a single turn control knob is utilized to simultaneously actuate an aircraft's elevator, rudder and aileron control surfaces.

An object of the present invention, therefore, is to provide a novel and improved simple turn control mechanism for automatic pilots or the like for use in high speed dirigible craft.

Another object of the invention is to provide a novel and improved automatic turn control mechanism for an aircraft automatic pilot whereby craft attitude may be changed while the craft is being flown at high speeds.

A further object of the present invention is to provide a novel automatic turn mechanism for controlling the automatic turning of aircraft at high speeds and wherein a single turn control knob simultaneously actuates bank, turn and pitch controllers; the displacement of the pitch controller being independent of the resultant displacements of the bank and turn controllers.

A still further object of the present invention is to provide a novel automatic turn mechanism for controlling the automatic turning of aircraft at high speeds and wherein a single turn control knob actuates an interconnected bank, turn and pitch controllers, the amount of pitch deflection being independent of the amount of rudder deflection.

The above and other objects and advantages of the present invention will appear more fully hereinafter from a consideration of the detailed description which follows, taken together with the accompanying drawings wherein one embodiment of the invention is illustrated.

Figure 2:
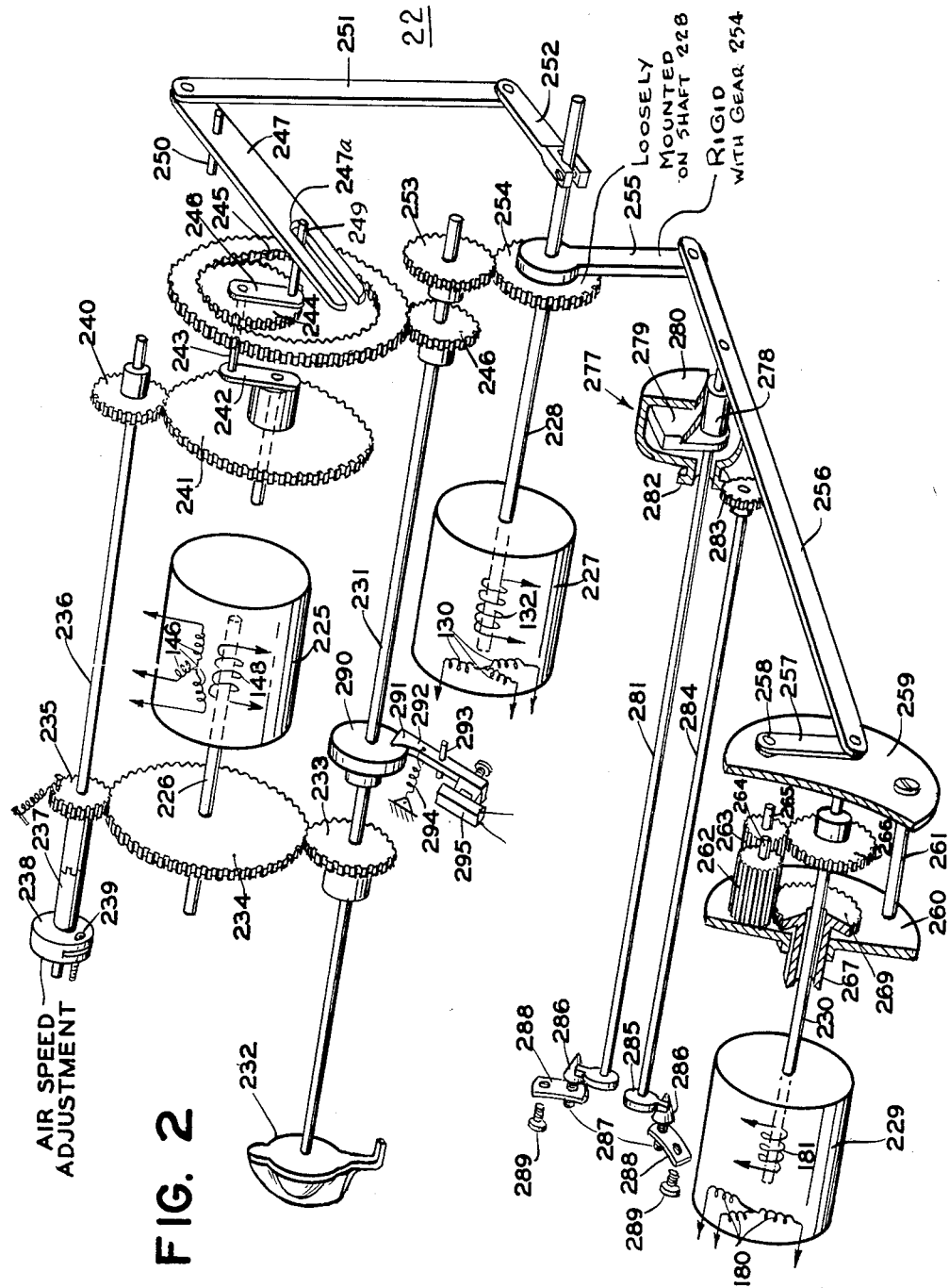

In the drawings, wherein like reference characters refer to like parts throughout the several views, Figure 1 is a diagrammatic illustration of an automatic control system for dirigible craft embodying the novel automatic turn control unit of the present invention;

Figure 2 is a detailed schematic illustration of the novel turn control mechanism of the present invention.

Referring now to the drawings for a more detailed description of the present invention and more particularly to Figure 1 thereof, the novel turn controller hereof is shown as embodied in an automatic pilot providing three axes of control, claimed and described more fully in copending application Serial No. 516,488, filed December 31, 1943, and now U. S. Patent No. 2,625,348, issued January 13, 1953.

As more fully described in Patent No. 2,625,348, the control of rudder 10 as shown in Figure 1, is derived from a gyro stabilized earth inductor type compass 11 and a rate of turn gyro pick-off 12. The compass includes an inductive coupling device 13 having an angularly movable rotor 14, a motor 15 for displacing rotor 14, a compass signal transmitter 16, and a magnetic clutch 17 for coupling the rotor 14 with the signal transmitter under certain conditions. The compass signal transmitter is connected with the rudder channel of an amplifier 18, the output of which energizes a servomotor 19 connected to the rudder through a clutch 20. The rate signal of pick-off 12 is also impressed on the rudder channel of the amplifier through an inductive rate of turn receiver device 131, comprising a wound stator 130 and an inductively coupled wound rotor 132, arranged within the novel controller unit of the present invention, generally designated with the reference character 22, to be described more fully hereinafter. Operation of rudder motor 19 displaces rudder 10 and also an inductive follow-up device 23 developing in the latter a follow-up signal which is impressed on the rudder channel of the amplifier to be mixed with the displacement and rate signals.

Signals for operating aileron and elevator surfaces 24 and 25, on the other hand, are developed by bank and pitch take-offs 26 and 27 arranged about the bank and pitch axes of an artificial horizon gyro 28. As a result of a banked condition, take-off 26 developes a bank signal which is coupled to the input of the aileron channel of amplifier 18 through an inductive bank receiver device 147, comprising a wound stator 146 and an inductively coupled wound rotor 148, located within unit 22, the output of the channel being connected to energize a servomotor 30 which connects through a clutch 31 with aileron surface 24. Operation of motor 30 displaces an inductive follow-up device 32 developing a follow-up signal therein which is impressed upon the bank signal in the amplifier to modify operation of motor 30. In a similar manner, as a result of a pitch condition, take-off 27 develops a pitch signal which is communicated by way of leads 182 to the input of the elevator channel of amplifier 18 through an inductive pitch receiver device 33, comprising a wound stator 180 and an inductively wound rotor 181 likewise located within unit 22, the output of the pitch channel being connected to energize the servomotor 34 which connects through a clutch 35 with elevator surface 25, the operation of the motor displacing an inductive follow-up device 36 developing a follow-up signal therein which is impressed on the pitch signal in the amplifier to modify operation of motor 34.

Coming now to the automatic turn control unit constituting the subject matter of the present invention, which is shown schematically in Figure 2 as embodying an inductive bank device 225 having the wound stator 146 of Fig. 1 and the inductively coupled rotor 148 carried by a shaft 226, and inductive turn device 227 having the wound stator 130 of Figure 1 and the inductively coupled rotor 132 carried by a shaft 228.

In order to place a craft provided with the automatic pilot hereinabove described into an automatic turn, a turn shaft 231 is provided with a turn control knob 232 and gear 233 which is in engagement with a relatively large gear 234 fastened to the shaft 226. Angular displacement of turn knob 232 manifests itself in angular motion of rotor 148 relative to its stator through gears 233 and 234 and shaft 226. In this manner, signals are developed in the rotor and communicated by way of leads 149 to the input of amplifier 18 for the energization of motor 30 of the aileron servo system, it being noted that bank signals are developed at the panel independently of the gyro horizon or master instrument 28.

In addition to the bank signal, the proper rudder and elevator signals are likewise set in by turn knob 232, the rudder signal being derived from the inductive turn device 227 which is connected through an adjustable air speed linkage (to be presently described) with bank device 225 and the up-elevator signal being derived from the pitch device 229 which is connected with the bank device through a linkage to be described hereinafter.

Motion of gear 234 as a result of the displacement of turn knob 232 resolves itself into motion of a gear 235 sleeved on an airspeed adjustment shaft 236, the hub of gear 235 being yieldably urged into engagement with the hub 237 of a lock member 238 which is normally locked by way of a screw 239 to shaft 236. Lock member 238 has a split portion and tightening of screw 239, cams or wedges the lock member against shaft 236 so as to lock the member to the shaft. Motion of gear 235, therefore, is translated into movement of shaft 236 whose free end has fastened thereto a gear 240 adapted for driving a relatively large gear 241 which supports at its center by way of a bracket 242 a shaft 243 carrying a gear 244 which meshes with an internal gear 245, the outer periphery of gear 245 being toothed for driving engagement with a pinion 246 fastened to the free end of turn shaft 231. Assuming proper airspeed adjustment, motion of turn knob 232 causes rotation of gear 240 and pinion 246 whereby both gear 241 and internal gear 245 move together so that a pin 249 secured by a bracket 248 to gear 244 moves in an arc and by so doing angularly displaces a lever 247 about a pivot 250, the lever having a relatively long slot 247a for cooperation with pin 249. Movement of lever 247 about pivot 250 produces up or down motion of a link 251 which connects with one end of a short link 252 fastened to turn rotor shaft 228. By virtue of the foregoing connection, rotor 132 of inductive turn device 227 is displaced angularly relative to its stator whereupon signals are developed in the rotor and communicated by way of leads 133 to the rudder channel of amplifier 18.

For the purpose of displacing rotor 181 of the pitch device 229 relative to its stator 180 to thereby generate a signal for energizing the elevator servomotor 34 for displacing elevator 25 to trim the craft in pitch, a gear 253 pinned to turn shaft 231 engages a gear 254 fastened to the end of a link 255 loosely mounted on the shaft 228 of inductive turn device 227. It is apparent from the foregoing, that there is no direct driving connection between links 252 and 255, but rather, turn shaft 231, through gears 253 and 254 displaces link 255 which, as will be explained hereinafter, is driveably connected to rotor 181 of pitch device 229.

Pivotally connected to the other end of link 255 is an elongated link 256 which is connected at its free end to a link 257 secured at 258 to one side of a plate 259. Plate 259 comprises one side of a differential mechanism which is provided with a second plate 260 positioned parallel to plate 259 and secured thereto by bolts 261 to define a rotatable cage. A pair of gears 262 and 263 fastened to a pair of shafts 264 and 265, respectively, lie within the cage portion of the differential and have their ends journaled in the plates to revolve therewith. The rotor shaft 230 of the pitch device 229 passes through the center of plate 260 and has fastened at its free end a gear 266 which meshes with gear 263. Plate 260 is loosely mounted on a sleeve 267 which is sleeved on the rotor shaft 230 and held stationary thereto. Sleeve 267 has a gear 269 which is in mesh with gear 262 the former being normally locked whereby gear 262 creeps over gear 269 when plates 259 and 260 are rotated by actuating link 256.

The pitch differential operates to angularly displace the pitch rotor 181 relative to its stator in the following manner: As link 255 is moved by gears 253 and 254, motion is transmitted to elongated link 256 which engages a pitch cam system to be presently described, and one side of plate 259. Movement of the link 256 to the left or right will manifest itself in a clockwise rotation of plates 259 and 260 when the pitch cam system is in a non-flat condition. Sleeve 267 being held stationary, gear 262 will creep on gear 269 to rotate gear 263 and angularly displaces rotor 181 through gear 266 so that for either left or right turn of the turn knob 232 an up-elevator signal will be generated and communicated by way of leads 182 to the elevator servo channel of amplifier 18.

In order to insure proper initial setting of link 256 whereby for given rates of turn in either a left or right direction enough displacement of rotor 181 will be provided to maintain the craft in level altitude during turn, i. e. to prevent a nose-heavy or loss of altitude condition during a given turn, a pitch cam system generally designated with the character 277 is provided. To this end, therefore, link 256 is provided with a roller 278 which engages with a pair of cams 279, 280, the former cam 279 being fixed to a shaft 281 and the latter cam 280 being hollow and sleeved on the shaft and provided with a gear 282 for meshing with a pinion 283 carried by a second and parallel shaft 284. Adjustment of the two cams defines the limit of downward throw of roller 278 for a given left or right motion of link 256 and consequently the amount of displacement of rotor 181 for a given set turn.

Shafts 281 and 284 are provided at their free ends with collars 285 having lugs normally yieldably urged into engagement with longitudinally movable cones 286 engaged by adjusting screws 287. The screws are provided with straps 288 which normally lock screws 287 in a given position but upon loosening of other screws 289, the straps are actuated to unlock screws 289 and adjustment thereof will urge the cones relative to the lugs whereby shafts 281 and 284 are displaced angularly to set cams 279, 280 as desired.

In addition to gears 233, 246 and 253 turn shaft 231 carries a notched member 290 within whose notch rests a detent 291 carried by an arm 292 pivoted at 293 and yieldably urged to engage the notch by means of a yieldable member 294. When turn shaft 231 is displaced angularly, arm 292 is urged outwardly whereupon detent 291 leaves the notch while the opposite end of the arm, provided with a contact (not shown) is moved downwardly to open a pair of contacts (not shown), arranged within a conventional switch box 295, which normally connect a coil 67 of magnetic clutch 17 at the master indicator with a battery 69. Opening of the contacts by angular displacement of the turn shaft, therefore, deenergizes coil 67 so that the direction signal from the inductor compass is disconnected during a turn from the rudder servo channel.

If it is desired to adjust the airspeed linkage for a particular speed, it is only necessary to loosen screw 239 in lock member 238 whereby shaft 236 becomes free of member 238 and may be rotated to extent of limits built into 241 as a result of which gear 241 is displaced relative to internal gear 245 which is held fast by gear 246, its shaft 231 being locked by detent 291, whereupon gear 244 creeps within the internal gear to displace pin 249 linearly relative to slot 247a of lever 247. It is to be noted that by unlocking member 238 from shaft 236, gear 235 will not be rotated upon rotation of the shaft so that gear 246 remains stationary. Thus, gear 246 holds fast gear 245 to permit rotation of gear 244 to linearly displace pin 249 within slot 247a.

In utilizing this arrangement for extremely high speeds so as to provide for very slight movement of rudder 10, the shaft 236 is rotated to move pin 249 inwardly into the slot 247a so that when pin 249 is positioned at the closed end of the slot, movement of turn knob 232 and accompanying rotation of gears 246, 244 and 245 will effect little or no angular movement of the pin. As a result, when the craft is to be brought into an automatic turn at high speeds by movement of turn knob 232, link 252 which is fastened to turn rotor shaft 228 moves slightly to rotate shaft 228 and consequently displace rudder 10 a very small amount or in cases when rudder movement is not needed, shaft 228 remains stationary. Thus, it can readily be understood that the instant arrangement provides for slight or no turning of the rudder 10 when the craft is brought into an automatic turn by means of turn knob 232. However, since pitch deflection must also be accounted for in the change of craft attitude, and inasmuch as a greater angular displacement of the pitch rotor shaft 230 than displacement of turn rotor shaft 228 must be had, the novel connection between turn shaft 231 and link 255 provides the novel means for accomplishing this end.

It is apparent from the description of the actuating arrangement set forth hereinbefore, that angular displacement of the inductive pitch rotor 181 is effected independently of the angular displacement of inductive turn rotor 132. By this novel arrangement, a single turn control knob may simultaneously actuate bank, turn and pitch reproducing means for executing an automatic turn, and at the same time provide for greater displacement of the elevators and little if any movement of the rudder in aircraft being flown at high speeds.

It will now be readily understood by those skilled in the art that by operating turn knob 232, bank, turn and pitch signals are developed in inductive devices 225, 227 and 229 independently of their respective master instruments whereby the aileron, rudder and elevator surfaces are deflected the proper amount to place the craft in a turn attitude, surface deflection continuing until the follow-up signals of inductive devices 23, 32 and 36 (Figure 1) are equal and opposite to the bank, turn and pitch signals of devices 225, 227 and 229. As the correct craft attitude is attained, signals are generated by the master instruments, i. e., rate take-off 12 and the bank and pitch take-off arranged at gyro 18 to wash out the signals developed by devices 225, 227 and 229. Should the craft depart from such attitude the master instruments will operate to return the craft to the desired attitude. Once the new course is attained, turn knob 232 is centered manually to set the craft on the new course and switch 295 is closed to energize coil 67 of clutch 17 of the master indicator whereby the compass takes over and maintains directional control of the rudder.

Although but a single embodiment of the invention has been illustrated and described in detail, it is to be expressly understood that the invention is not limited thereto. Various changes may also be made in the design and arrangement of the parts without departing from the spirit of the invention as the same will now be understood by those skilled in the art.

I claim:

1. A controller unit for an automatic pilot for use in aircraft, said pilot having rudder, aileron and elevator actuating motors together with master instruments for normally controlling said motors, comprising turn, bank and pitch signal developing devices adapted to be connected to the master instruments and to the rudder, aileron and elevator motors for controlling the motors independently of their related master instruments, a driving arrangement including a settable airspeed linkage interconnecting the turn and bank devices, the linkage being settable to provide relatively small displacement of the turn device for a relatively large displacement of the bank device, a rotatable shaft included in the driving arrangement and connected to displace the turn device, a loosely mounted member on said shaft drivably connected with said pitch device, and means comprising a turn control member drivably connected with the settable airspeed linkage and the loosely mounted member for simultaneously operating said bank, turn and pitch devices.

2. A controller unit for an automatic pilot for use in aircraft, said pilot having rudder, aileron and elevator actuating motors together with master instruments for normally controlling said motors, comprising turn, bank and pitch signal developing devices adapted to be connected to the master instruments and to the rudder, aileron and elevator motors for controlling the motors independently of the master instruments, a turn control member, adjustable linkage means interconnecting said bank and turn devices and operable by said turn control member for operating said bank and turn devices and means drivably connecting said turn control member and said pitch device for operating said pitch device independently of said turn device.

3. A controller unit for an automatic pilot for use in aircraft, said pilot having rudder, aileron and elevator actuating motors together with master instruments for normally controlling said motors, comprising turn, bank and pitch signal developing devices adapted to be connected to the master instruments and to the rudder, aileron and elevator motors for controlling the motors independently of their master instruments, a turn control member, linkage means interconnecting said turn and bank devices and operable by said turn control member to provide for conjoined operation of said devices, and means drivably connecting said turn control member and said pitch device, said means being independent of said linkage means and driven by said turn control member to operate said pitch device independently of said turn device.

4. A controller unit for an automatic pilot for use in aircraft, said pilot having rudder, aileron and elevator actuating motors together with master instruments for normally controlling said motors, comprising turn, bank and pitch signal developing devices connected to the master instruments and to the rudder, aileron and elevator motors for controlling the motors independently of their master instruments, a turn control member, driving means including a settable linkage interconnecting the bank and turn devices and operable by said turn control member to provide for conjoined operation of said bank and turn devices, said linkage including a link connected for operating said turn device, and a motion transmitting member drivably connected to said turn control member and movable by the latter independently of said link, said motion transmitting member being connected for operating said pitch device independently of said turn device.

5. A controller unit for an automatic pilot for use in aircraft, said pilot having rudder, aileron and elevator actuated motors together with master instruments for normally controlling said motors, comprising turn, bank and pitch signal developing devices adapted to be connected to the master instruments and to the rudder, aileron and elevator motors for controlling the motors independently of their master instruments, driving means including a linkage for connecting said bank device with said turn device comprising a slotted pivoted lever operatively connected to a shaft of said turn device, means comprising a pin cooperating with the slot of said lever and linearly adjustable therein to provide for zero to maximum motion of said lever, a turn control member for operating said driving means, bank device and simultaneously said pin to oscillate said lever to thereby operate the shaft of said turn device, and means comprising a loosely mounted member on the shaft of said turn device for movement relative to said shaft and operatively connected to said pitch device, said loosely mounted member being operable by said turn control member to provide operation of said pitch device only when the pin is adjusted for zero motion of said lever.

6. In an aircraft automatic pilot system having rudder, aileron and elevator actuating motors and master instruments for normally controlling said motors, a controller unit comprising turn, bank and pitch signal developing devices adapted to be connected to the master instruments and to the rudder, aileron and elevator motors for controlling the motors independently of the master instruments, a control member, and means operatively connecting said control member with said turn, bank and pitch signal developing devices for operating said signal developing devices, said connecting means including linkage means interconnecting said control member and said turn signal developing device for modifying the operation of said turn signal developing device by said control member as a function of the airspeed of the craft, and means drivably connecting said control member with said bank and pitch devices to provide for conjoined operation of said bank and pitch devices independently of said turn device whereby said control member conjointly operates said pitch and bank devices to develop signals therein although said linkage may have so modified the operation of said turn device as to have no turn signal developed.

7. In an aircraft automatic pilot system having servomotors for displacing the yaw, roll and pitch control surfaces, a controller unit comprising yaw, roll, and pitch signal developing devices operatively connected with said servomotors, a control member, and means interconnecting said control member and said signal developing devices whereby said signal developing devices are operated by the actuation of said control member to develop yaw, roll, and pitch signals for said servomotors, said interconnecting means including means for modifying the operation of said yaw signal developing device by said control member as a function of airspeed independently of the operation of said roll and pitch signal developing devices.

References Cited in the file of this patent

UNITED STATES PATENTS

| | | |
|---|---|---|
| 2,516,641 | Murphy | July 25, 1950 |
| 2,516,796 | Noxon et al. | July 25, 1950 |